C. A. HILL.
PLUG FOR REPAIRING PNEUMATIC TIRES.
APPLICATION FILED AUG. 14, 1915.
1,193,387. Patented Aug. 1, 1916.
Fig. 1.
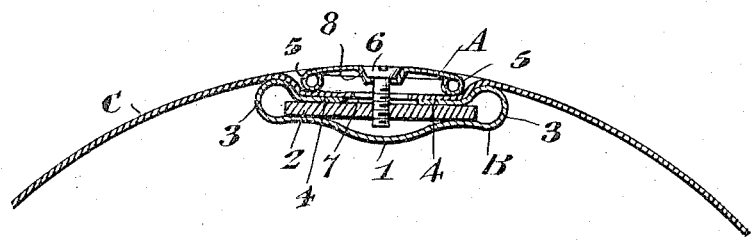
Fig. 2.
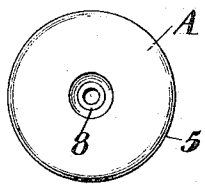
Fig. 3. Fig. 4.
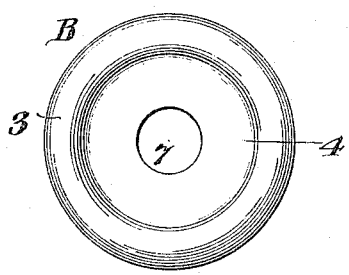 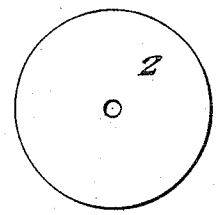
Fig. 5.
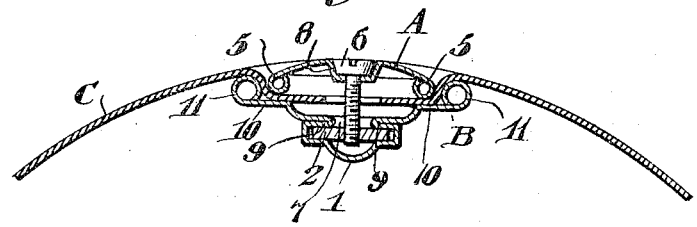
WITNESSES: Charles A. Hill, INVENTOR
Jas. K. M'Cathran
Watts F. Estabrook BY
Attorney

UNITED STATES PATENT OFFICE.

CHARLES AUGUST HILL, OF WELLSBURG, WEST VIRGINIA.

PLUG FOR REPAIRING PNEUMATIC TIRES.

1,193,387.           Specification of Letters Patent.      Patented Aug. 1, 1916.

Application filed August 14, 1915. Serial No. 45,501.

*To all whom it may concern:*

Be it known that I, CHARLES A. HILL, a citizen of the United States, residing at Wellsburg, in the county of Brooke and State of West Virginia, have invented a new and useful Plug for Repairing Pneumatic Tires, of which the following is a specification.

This invention relates to an improvement in plugs for repairing pneumatic tires, and the object is to provide means for repairing a puncture or blow-out in an inner tube of a pneumatic tire.

A further object is the provision of means for fastening two disks or buttons together for confining the inner tube therebetween and closing the opening in the tire formed by the puncture or blow-out. The surfaces of the disks or buttons are made smooth so that there is no danger of cutting or injuring the inner tube or casing.

The invention consists of certain novel features of construction and combinations of parts which will be hereinafter described and pointed out in the claims.

It is evident that changes in the form, proportion, material and minor details of construction within the scope of the appended claims, may be made without departing from the spirit or sacrificing any of the advantages of this invention.

In the accompanying drawings:—Figure 1 is a vertical sectional view of the invention applied to the inner tube of a pneumatic tire, showing the inner tube in section; Fig. 2 is a top plan view of the outer disk or button; Fig. 3 is a top plan view of the inner disk or button; Fig. 4 is a plan view of the circular plate or nut; and Fig. 5 is a vertical sectional view of a modified form of the invention, applied to the inner tube of a pneumatic tire, showing the inner tube in section.

A, represents the outer disk or button, and B the inner disk or button of the plug. Both disks are constructed of aluminum, and made as light as possible, so that no perceptible weight is added to the inner tube. The disks may be round, oblong or oval, and in fact, may be made in any shape to conform to the shape of the blow-outs and punctures. The general shape of each disk is concavo-convex or dish-shaped with the convex side facing outwardly.

The inner disk B is depressed at its center forming a convex surface on its outer side and a concave surface on its inner side, as at 1, producing a bulge or inverted arch-shaped formation. The edges of the disk are bent or rolled upwardly and inwardly and rounded forming an annular peripheral bead 3, and the free edge of the disk extends inwardly forming a central flat bearing face 4, and defining a central opening 7. A circular stiff plate or nut 2 is received and held between the flat or smooth portion 4, and the main portion or bottom of the disk.

The outer disk A has a convex outer surface and a concave inner surface, and the edges of the disk are turned or rolled downwardly and inwardly forming an annular peripheral bead 5 on its inner surface. The bead 5 is adapted to come in contact with the flat portion or bearing face 4 of the disk B, and is thus spaced inwardly from the rounded bead 3 of the inner disk B, and is held in engagement therewith by a screw or bolt 6, which passes through the disk A, and the opening 7 provided by the flat bearing portion 4 of the disk B, and has screw-threaded engagement with the plate or nut 2. The disk A is countersunk at the center forming a recess 8 for the head of the screw surface of the disk A, and any danger of injuring the outer casing of the tire by frictional contact is eliminated.

When the plug is to be applied to an inner tube C, the inner disk B is inserted through the opening formed by the puncture or blow-out, and the edges of the inner tube around the opening are placed upon the flat face 4. The outer disk A is then placed upon the inner tube and the bead 5 of the outer disk A will engage the inner tube and press it snugly against the flat face 4 of the inner disk B. The screw or bolt 6 is passed through the disk A and is caused to engage the plate or nut 2, and as the screw is screwed into the plate, the two disks A and B will be drawn together for confining the inner tube therebetween for the purpose of closing the opening therein. The surfaces of the beads 5 and 3, of the disks A and B, respectively, are rounded and smooth in order not to tear or injure the inner tube. These beads 3 and 5, shown in Fig. 1, and 5 and 11, shown in Fig. 5, provide, in both forms of the invention, smooth, rounded reinforcing edges for the inner and outer disks, which interfit and admit of the nesting of the outer disk in the inner disk, and provide means for rolling the wall of the inner tube over the edges of the disk to prevent cutting and chafing of the tube.

In the construction shown in Fig. 5, the inner disk B, has the wall thereof bent inwardly forming an annular flange or rim 9 for confining the plate or nut 2 between the edges of the concavo-convex central portion 1 and the flange 9. The disk B is then bent outwardly and upwardly producing a marginal flat face 10, similar to the flat marginal face 4, of the other form, and the edges are rolled inwardly onto the flat face forming an annular bead 11. The disk A is fitted to the inner disk B in the same manner as in the construction shown in Fig. 1, by having the bead 5 engage the marginal face 10, for confining the inner tube between the beads 5 and 11, and between the bead 5 and flat face 10.

From the foregoing it will be seen that no cement is needed to fasten the two disks together, nor is it necessary to prepare the inner tube before applying the disks. Furthermore no rough edges are provided which would be destructive to either the inner tube or outer casing. The outer disk A is of such a size and contour that it fits within the annular bead 3 of the inner disk B, so that the two disks when connected together present a surface which conforms to the curvature assumed by the inner tube.

The plug has been in use for some time, and very satisfactory results have been obtained, and with the use of the plug it has been unnecessary to vulcanize the inner tube.

The bulge or depressed portion 1 of the inner disk B adds strength to the disk when the disks are drawn together, and it also forms a cavity in which the end of the screw 6 may enter in drawing the disks toward each other. The screw is the only part that rotates, as neither disk rotates, because such a movement would be injurious to the inner tube.

What is claimed is:—

1. A plug for repairing pneumatic tires comprising sheet metal inner and outer disks adapted for engagement against the opposite sides of an inner tube wall, the inner disk having a depressed flat bearing face and an annular bead surrounding the flat face, and the outer disk having an inwardly extending peripheral bead in registry with said flat face for engagement with the wall of the inner tube inwardly of said bead to bind said wall against the flat face, and means for binding said disks together against the opposite sides of the inner tube wall.

2. A plug for repairing pneumatic tires comprising an inner member formed of a sheet metal disk having its bottom formed with a central depression and having its marginal edge rolled over and inturned to provide an annular peripheral bead and a flat bearing face inwardly of the bead, a stiff metal plate fitting between the bottom portion of the disk and said flat face and held in position thereby, an outer member of less diameter than the inner member and formed of a second sheet metal disk having its marginal edge rolled downwardly and inwardly to provide an annular peripheral bead, said annular bead of the outer member being spaced inwardly from the marginal bead of the inner member, so as to bind the inner tube wall against said flat face of the inner member, and a binding screw passing through said outer member and engaging in threaded relation with said stiff plate of the inner member to bind the members together.

3. A plug for repairing pneumatic tires comprising an inner member formed of a sheet metal disk rolled over concentrically at its intermediate portion to provide an annular rounded bead at the outer edge of the member, the edge of the disk extending inwardly and horizontally from the bead to form a flat bearing face to receive the wall of a tire thereagainst, and to maintain said wall in flat position, a relatively stiff metallic plate fitted in said member beneath the flat marginal edge thereof to support the same and having a central threaded opening, an outer member formed of a sheet metal disk having its marginal edge rolled downwardly to provide a depending annular bead at the outer edge of the outer member, the outer member being of a diameter less than that of the inner member to register the depending bead over and upon said flat bearing face, and a clamping screw passing downwardly through the outer member and into said threaded opening in the supporting plate to draw the members together and clamp the wall of the tire between the flat face and the depending bead.

4. A plug for repairing pneumatic tires comprising sheet metal inner and outer disks adapted for engagement against the opposite sides of an inner tube wall, the inner disk having its marginal edge rolled over and inturned to provide an annular peripheral bead and a flat bearing face inwardly of said bead, said bearing face being arranged in a plane below the bead, a stiff metal plate mounted within the inner disk below the said face and constituting a support for the latter, an outer disk of less diameter than the inner disk and having its edge formed with an annular peripheral bead, which, when the outer disk is applied to the inner disk, is spaced inwardly from the marginal bead of the inner disk so as to bind the inner tube wall against the flat bearing face of the inner disk, and a screw connecting the outer disk with the plate of the inner disk to bind said disks together.

In testimony that I claim the foregoing as my own I have hereto affixed my signature in the presence of two witnesses.

CHARLES AUGUST HILL.

Witnesses:
DANIEL STOREK,
FRANK FOWLER.

Copies of this patent may be obtained for five cents each, by addressing the "Commissioner of Patents, Washington, D. C."